United States Patent
Sundararajan et al.

(10) Patent No.: US 10,334,594 B2
(45) Date of Patent: Jun. 25, 2019

(54) ULTRA-RELIABLE LOW-LATENCY COMMUNICATION MINI-SLOT CONTROL

(71) Applicant: QUALCOMM Incorporated, San Diego, CA (US)

(72) Inventors: Jay Kumar Sundararajan, San Diego, CA (US); Hao Xu, Beijing (CN); Jing Jiang, San Diego, CA (US); Tingfang Ji, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 15/661,668

(22) Filed: Jul. 27, 2017

(65) Prior Publication Data

US 2018/0132237 A1    May 10, 2018

Related U.S. Application Data

(60) Provisional application No. 62/417,852, filed on Nov. 4, 2016.

(51) Int. Cl.
*H04W 72/00* (2009.01)
*H04W 72/04* (2009.01)
*H04L 1/18* (2006.01)

(52) U.S. Cl.
CPC ....... *H04W 72/0446* (2013.01); *H04L 1/1812* (2013.01); *H04W 72/042* (2013.01)

(58) Field of Classification Search
CPC ... H04L 5/0044; H04L 5/0051; H04L 5/0055; H04L 5/0096; H04W 72/042; H04W 72/0446; H04W 72/14

USPC .......................................................... 370/329
See application file for complete search history.

(56) References Cited

U.S. PATENT DOCUMENTS

| | | | |
|---|---|---|---|
| 2018/0027522 A1* | 1/2018 | Lee | H04W 68/02 370/336 |
| 2018/0063858 A1* | 3/2018 | Au | H04W 16/14 |
| 2018/0139762 A1* | 5/2018 | Cho | H04W 72/1284 |

OTHER PUBLICATIONS

ETRI: "Multiplexing of eMBB and URLLC Transmissions", 3GPP TSG RAN WG1 Meeting #86, Lisbon, Portugal, R1-1609392, Oct. 9, 2016 (Oct. 9, 2016), XP051149435, 4 Pages, Retrieved from the Internet: URL:http://www.3gpp.org/ftp/Meetings_3GPP_SYNC/RAN1/Docs/, [retrieved on Oct. 9, 2016].
International Search Report and Written Opinion—PCT/US2017/055924—ISA/EPO—dated Jan. 15, 2018.
ZTE et al: "URLLC and eMBB Frame Structure and Multiplexing", 3GPP TSG RAN WG1 Meeting #86, Lisbon, Portugal, R1-1608957, Oct. 9, 2016 (Oct. 9, 2016), XP051149010, 7 Pages, Retrieved from the Internet:URL:http://www.3gpp.org/ftp/Meetings_3GPP_SYNC/RAN1/Docs/, [retrieved on Oct. 9, 2016].

* cited by examiner

*Primary Examiner* — Charles T Shedrick
(74) *Attorney, Agent, or Firm* — Harrity & Harrity, LLP

(57) ABSTRACT

A method, an apparatus, and a computer program product for wireless communication are provided. The apparatus may identify control signaling information for a mini-slot to be used for an ultra-reliable low-latency communication (URLLC) transmission within an enhanced mobile broadband (eMBB) slot. The apparatus may transmit the control signaling information within the eMBB slot.

30 Claims, 12 Drawing Sheets

ULTRA-RELIABLE LOW-LATENCY COMMUNICATION MINI-SLOT CONTROL

CROSS REFERENCE TO RELATED APPLICATION UNDER 35 U.S.C. § 119

This application claims priority to U.S. Provisional Patent Application No. 62/417,852 filed on Nov. 4, 2016 entitled "ULTRA-RELIABLE LOW-LATENCY COMMUNICATION MINI-SLOT CONTROL," which is incorporated by reference herein.

BACKGROUND

Field

Aspects of the present disclosure generally relate to wireless communications, and more particularly to techniques and apparatuses for ultra-reliable low-latency communication (URLLC) mini-slot control.

Background

Wireless communications systems are widely deployed to provide various telecommunication services such as telephony, video, data, messaging, and broadcasts. Typical wireless communications systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communications network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In an aspect of the disclosure, a method, an apparatus, and a computer program product are provided.

In some aspects, the method may include identifying, by an access point, control signaling information for a mini-slot associated with an ultra-reliable low-latency communication (URLLC) transmission within an enhanced mobile broadband (eMBB) slot; and transmitting, by the access point, the control signaling information within the eMBB slot.

In some aspects, a device for wireless communication may include one or more processors configured to identify control signaling information for a mini-slot associated with an URLLC transmission within an eMBB slot; and transmit the control signaling information within the eMBB slot.

In some aspects, a non-transitory computer-readable medium may store instructions for wireless communication that, when executed by one or more processors of an access point, cause the one or more processors to identify control signaling information for a mini-slot associated with an URLLC transmission within an eMBB slot; and transmit the control signaling information within the eMBB slot.

In some aspects, an apparatus for wireless communication may comprise means for identifying control signaling information for a mini-slot associated with an URLLC transmission within an eMBB slot; and means for transmitting the control signaling information within the eMBB slot.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
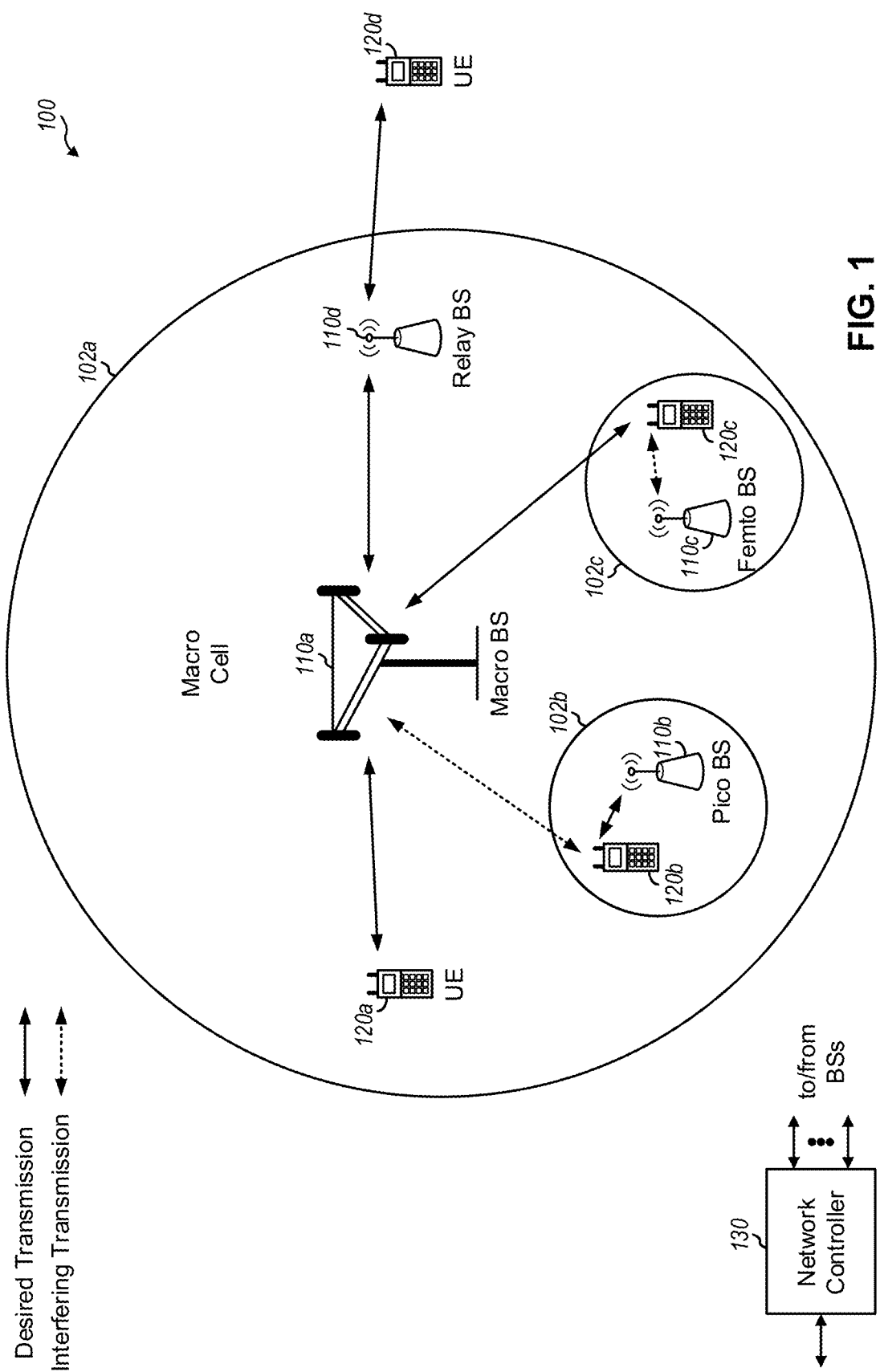
FIG. 1 is diagram| illustrating an example of a wireless communications network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, NR BS, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communications link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communications. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communications network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
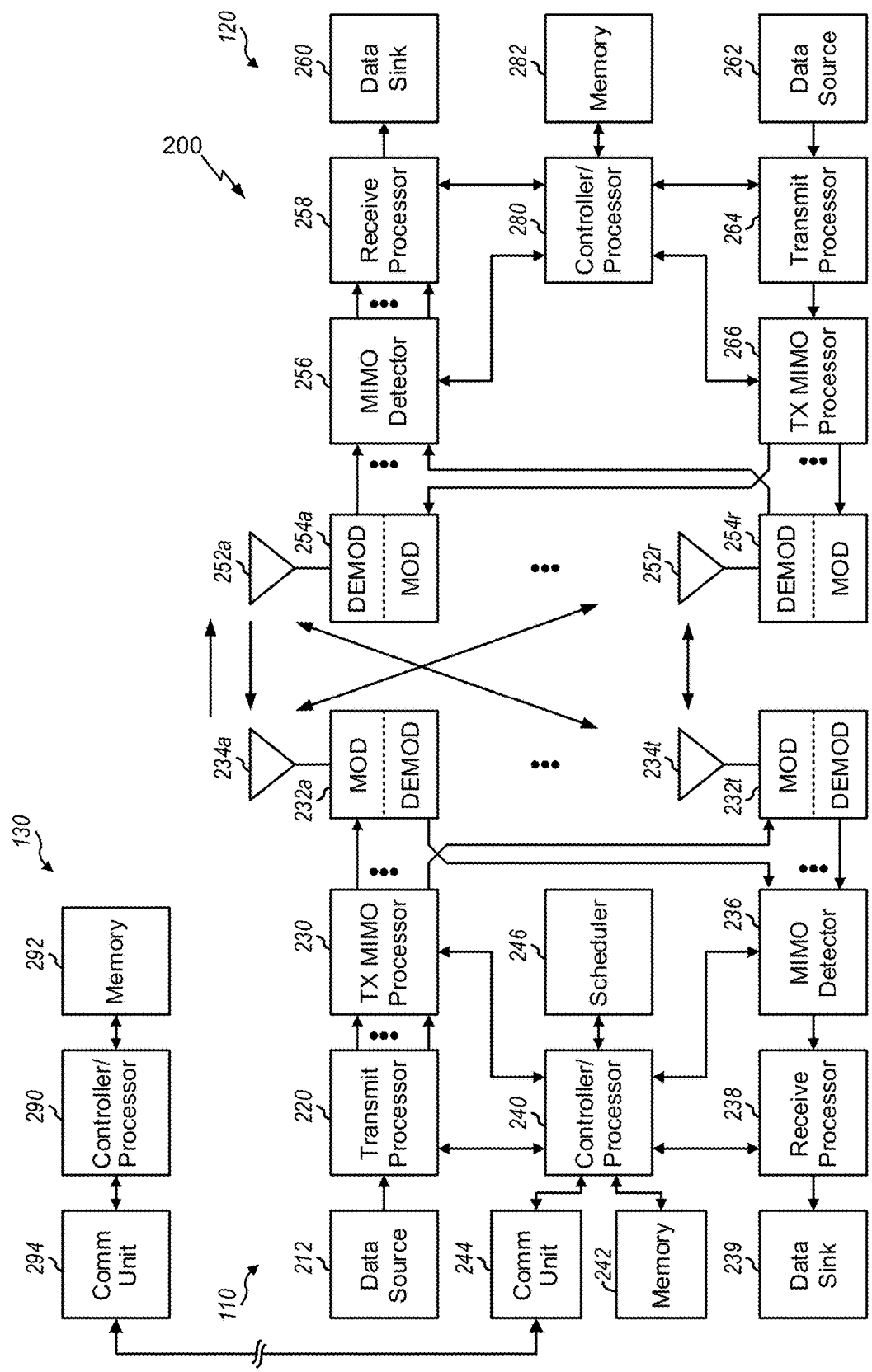
FIG. 2 is a diagram illustrating an example of a base station in communication with a user equipment (UE) in a wireless communications network.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to perform URLLC mini-slot control. For example, controller/processor 280 and/or other processors and modules at base station 110, may perform or direct operations of UE 120 to perform URLLC mini-slot control. For example, controller/processor 280 and/or other controllers/processors and modules at BS 110 may perform or direct operations of, for example, process 1000 FIG. 10 and/or other processes as described herein. In some aspects, one or more of the components shown in FIG. 2 may be employed to perform example process 1000 and/or other processes for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
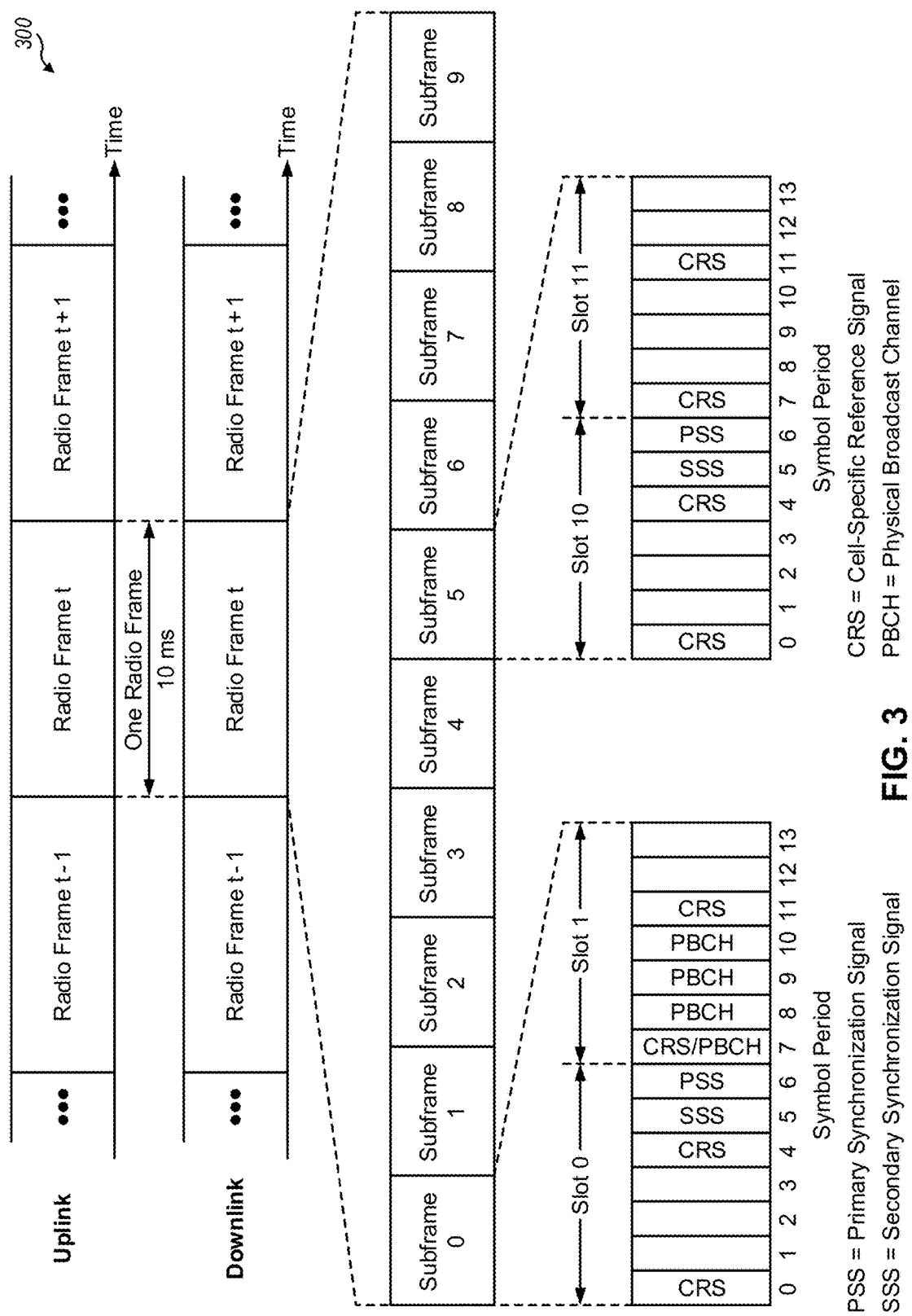
FIG. 3 is a diagram illustrating an example of a frame structure in a wireless communications network.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques implementations are described herein in connection with frames, subframes, slots, and/or the like, these implementations may equally apply to other types of wireless communication structures, which may be referred to using terms other than "frame," "subframe," "slot," and/or the like in 5G NR.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
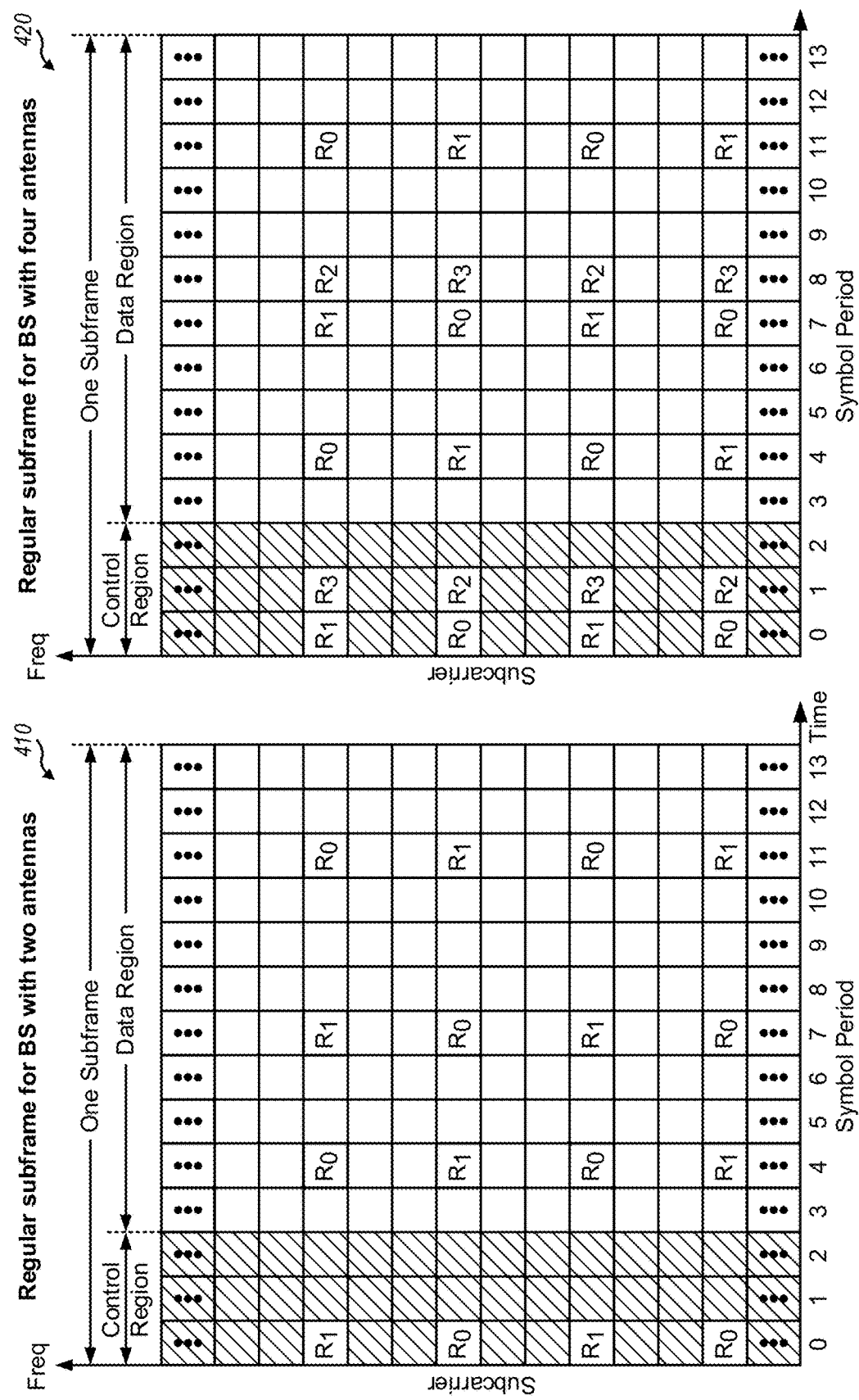
FIG. 4 is a diagram illustrating two example subframe formats with the normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
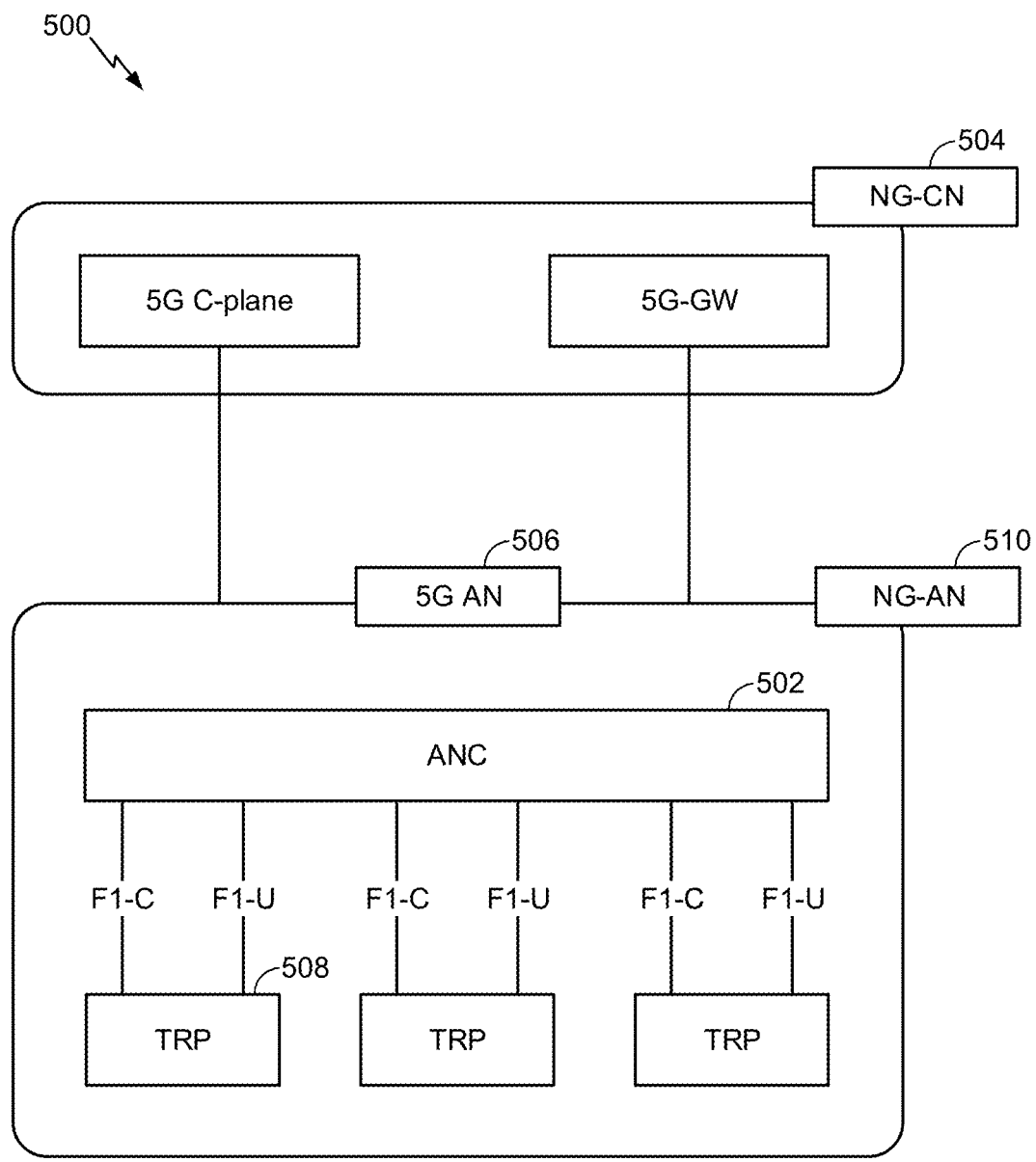
FIG. 5 is a diagram illustrating an example logical architecture of a distributed radio access network (RAN).

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The PDCP, RLC, MAC protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
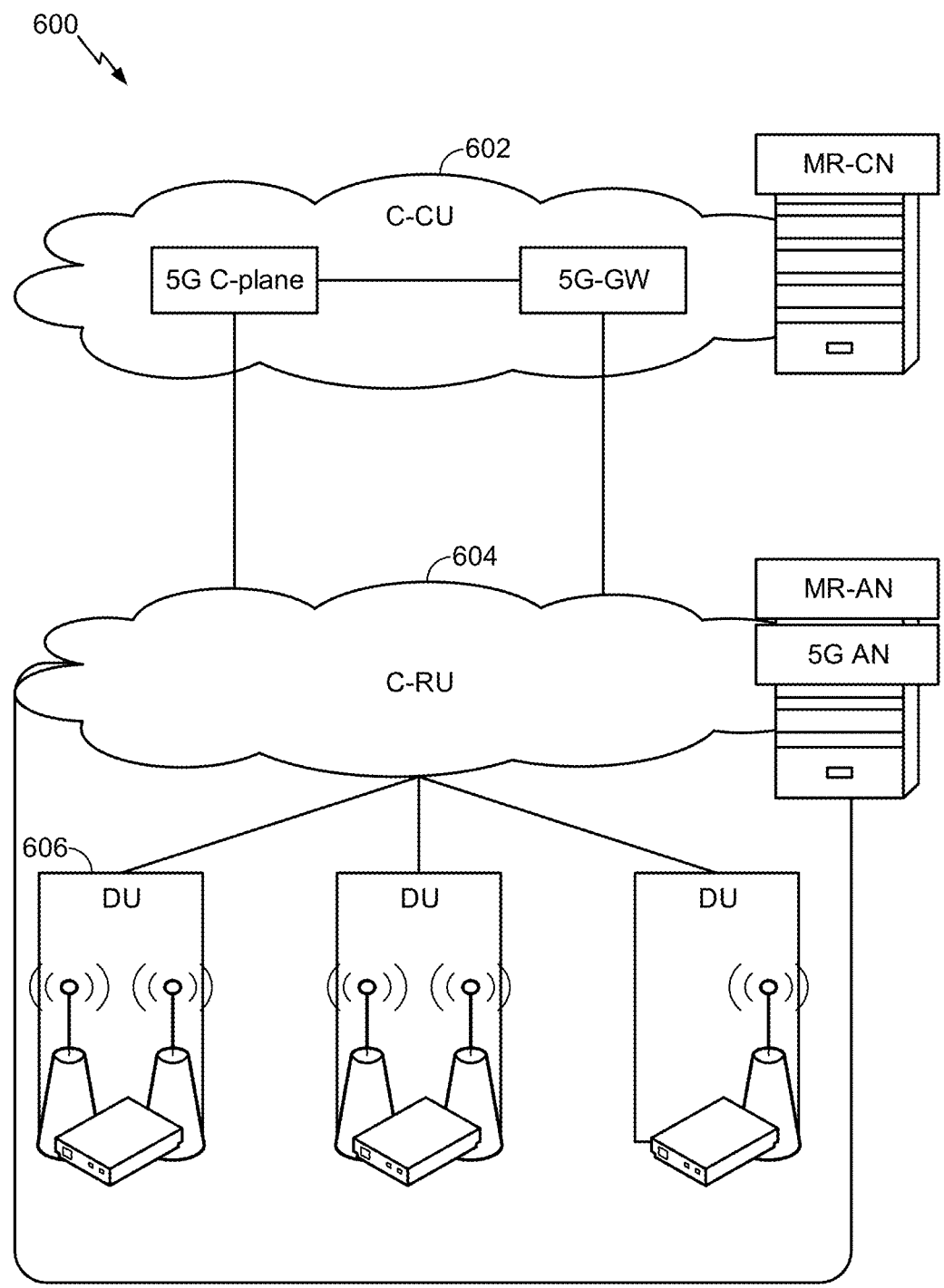
FIG. 6 is a diagram illustrating an example physical architecture of a distributed RAN.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
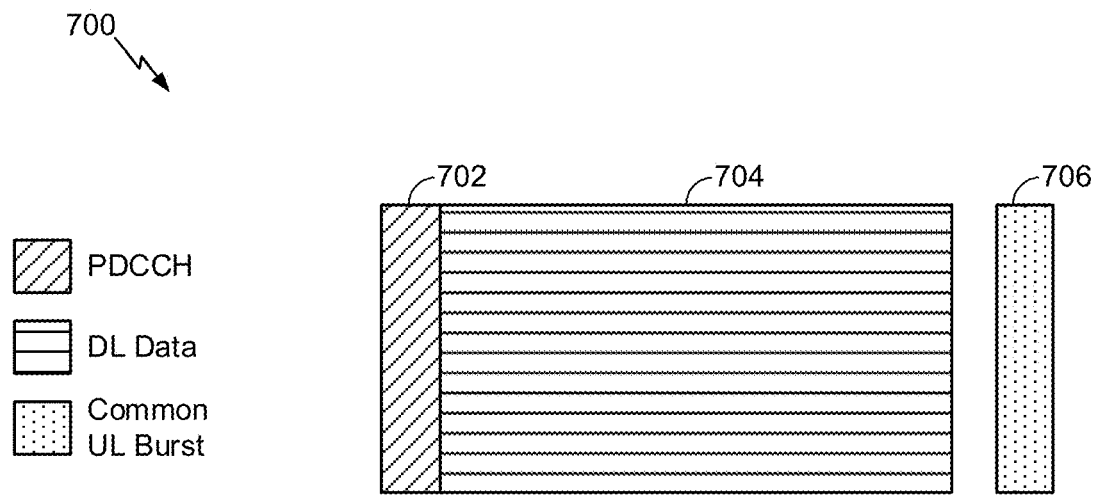
FIG. 7 is a diagram illustrating an example of a downlink (DL)-centric subframe.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include a common UL portion 706. The common UL portion 706 may sometimes be referred to as an UL burst, a common UL burst, and/or various other suitable terms. The common UL portion 706 may include feedback information corresponding to various other portions of the DL-centric subframe. For example, the common UL portion 706 may include feedback information corresponding to the control portion 702 and/or the DL data portion 704. Non-limiting examples of feedback information may include an ACK signal, a NACK signal, a HARQ indicator, and/or various other suitable types of information. The common UL portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the common UL portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
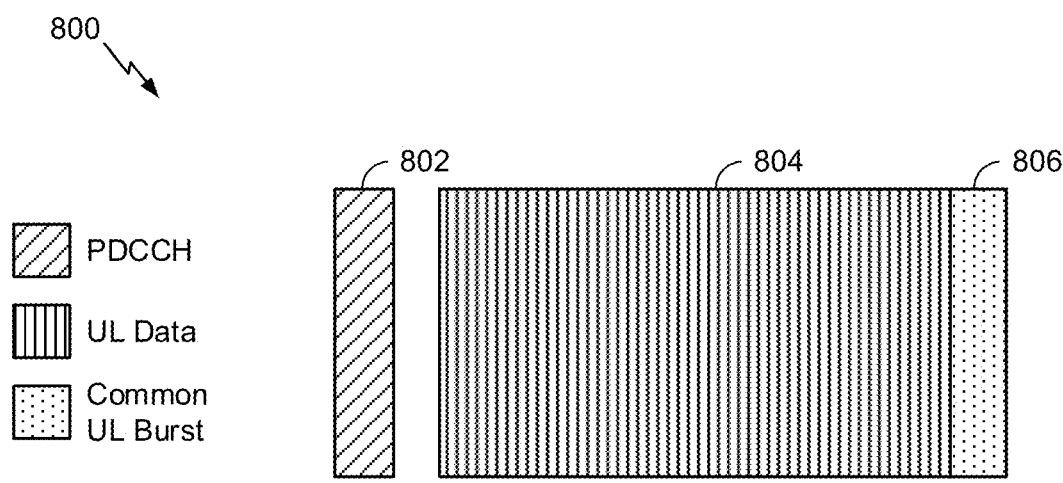
FIG. 8 is a diagram illustrating an example of an uplink (UL)-centric subframe.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 802 described above with reference to FIG. 8. In some configurations, the control portion 802 may be a physical DL control channel (PDCCH).

The UL-centric subframe may also include an UL data portion 804. The UL data portion 804 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 8, the end of the control portion 802 may be separated in time from the beginning of the UL data portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include a common UL portion 806. The common UL portion 806 in FIG. 8 may be similar to the common UL portion 706 described above with reference to FIG. 7. The common UL portion 806 may additionally or alternatively include information pertaining to channel quality indicator (CQI), sounding reference signals (SRSs), and various other suitable types of information. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a frame may include both UL centric subframes and DL centric subframes. In this example, the ratio of UL centric subframes to DL subframes in a frame may be dynamically adjusted based at least in part on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

As indicated above, FIG. 8 is provided merely as an example. Other examples are possible and may differ from what was described with regard to FIG. 8.

For an ultra-reliable low-latency communication (URLLC) service, latency and reliability requirements may be stringent. However a payload size (i.e., a size of information included in each packet) is typically small (e.g., on the order of a few tens of bytes). In comparison, an enhanced mobile broadband (eMBB) service typically employs larger packets (e.g., on the order of thousands of bytes). It follows that a slot used for a URLLC transmission may be smaller than a slot used for an eMBB transmission. Use of smaller slots for the URLLC service may allow requirements of the URLLC service to be satisfied. For example, use of the small slots allows for a shorter turn-around time for acknowledgment feedback (e.g., an acknowledgment (ACK) of a hybrid automatic repeat request (HARQ) transmission or re-transmission, a negative-acknowledgment (NACK) of the HARQ transmission or re-transmission), which helps achieve low latency. These small slots may be referred to as mini-slots.

Figure 9A:
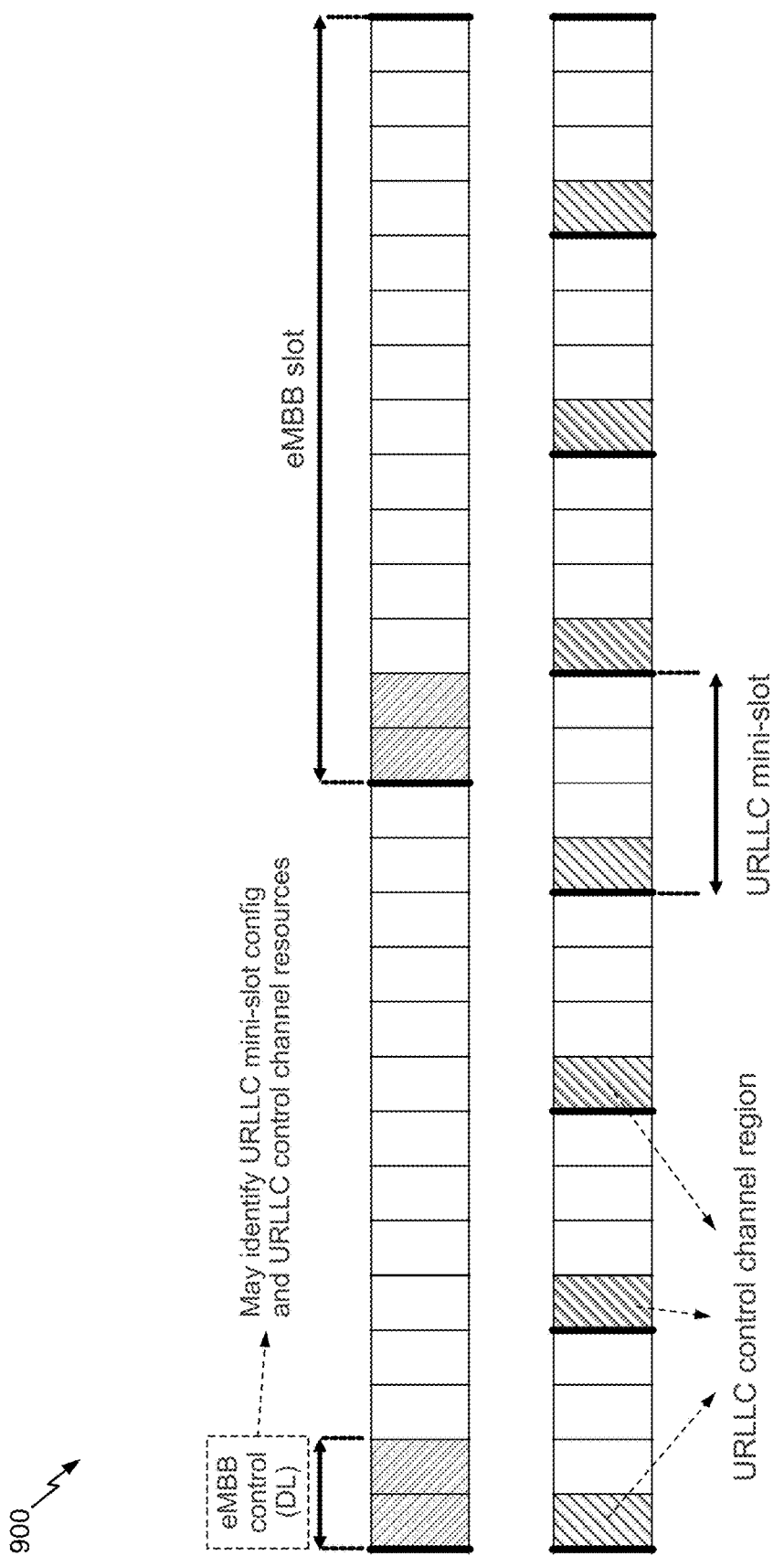
FIG. 9A is a diagram illustrating an example of a mini-slot configuration relative to an example eMBB slot configuration.

FIG. 9A is a diagram illustrating an example of a mini-slot configuration relative to an example eMBB slot configuration. As shown in the upper portion of FIG. 9A, the eMBB slot may be 14 symbols long (each rectangle represents a symbol in FIG. 9A), and may include two symbols designated for transmission of eMBB control information. In the upper portion of FIG. 9A, two eMBB slots are shown, each 14 symbols long and each including two symbols for transmitting eMBB control information. The eMBB slot configuration, shown in FIG. 9A, is provided merely as an example, and other configurations (e.g., with different numbers of symbols) are possible.

An example of a possible configuration of a set of mini-slots is shown in the lower portion of FIG. 9A. As shown, each mini slot may be four symbols long. As further shown in the lower portion of FIG. 9A, each mini-slot may include one symbol designated for transmission of URLLC control information (i.e., a URLLC control channel region). In the lower portion of FIG. 9A, seven mini-slots are shown, each four symbols long and each including a symbol for transmitting URLLC control information. The mini-slot configuration, shown in FIG. 9A, is provided merely as an example, and other configurations (e.g., with different numbers of symbols, with different quantities of mini-slots per eMBB slot, and/or the like) are possible.

FIG. 9A is provided to illustrate possible relative sizes and configurations of mini-slots and eMBB slots. Notably, in the examples shown in FIG. 9A, two eMBB slots may be a same size as seven mini-slots (e.g., since two eMBB slots use a total of 28 symbols and seven mini-slots use a total of a total of 28 symbols).

In order to improve efficiency in terms of resource usage and in order to ensure that URLLC requirements are satisfied, eMBB transmissions and URLLC transmissions may be multiplexed in time over a same set of resources. Specifically, within an eMBB slot, one or more symbols may be grouped, configured as a mini-slot, and utilized for a URLLC transmission (e.g., in an on-demand manner). In some aspects, an eMBB slot may include one or more resources used for an eMBB transmission and one or more resources used for a URLLC transmission. For example, a 14 symbol eMBB slot may include four symbols used for a URLLC transmission, and 10 symbols used for an eMBB transmission. In order to enable such multiplexing, the eMBB transmission, associated with the eMBB slot, may be suspended during the mini-slot in order to allow the URLLC transmission may be transmitted.

However, in order to enable use of a mini-slot for a URLLC transmission multiplexed with an eMBB transmission, an access point (e.g., a BS 110 or another network entity, such as a 5G access node 506) needs to provide UE 120 with control signaling information associated with the mini-slot. Implementations described herein describe techniques associated with designing and transmitting such control signaling information.

Figure 9B:
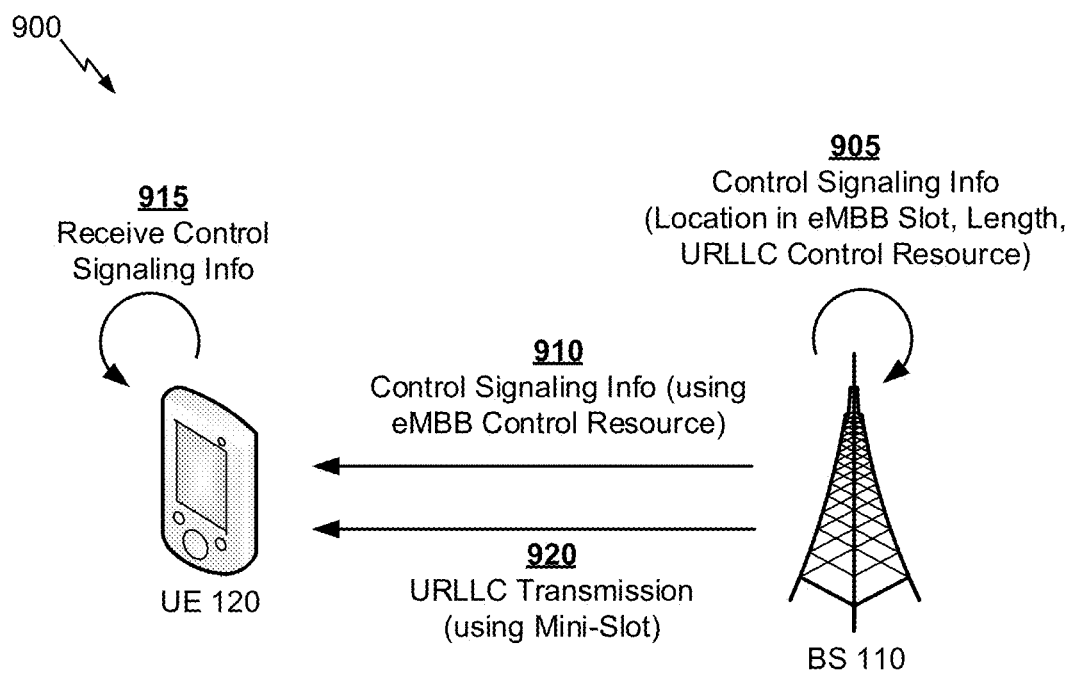
FIG. 9B is a diagram illustrating an example of an access point identifying and transmitting control signaling information, associated with a mini-slot to be used for a URLLC transmission, to a user equipment.

FIG. 9B is a diagram illustrating an example of BS 110 identifying and transmitting control signaling information, associated with a mini-slot to be used for a URLLC transmission, to UE 120.

As shown in FIG. 9B, and by reference number 905, BS 110 may identify the control signaling information associated with a mini-slot to be used for a URLLC transmission. In some aspects, BS 110 may identify the control signaling information when BS 110 identifies that BS 110 is to provide a URLLC transmission to UE 120 (e.g., when BS 110 receives a URLLC packet to be provided to UE 120). Additionally, or alternatively, BS 110 may identify the control signaling information based at least in part on a configuration of BS 110 (e.g., when BS 110 is configured to provide one or more mini-slots in a given eMBB slot regardless of whether BS 110 has received a URLLC packet to be provided to UE 120). In this case, BS 110 may configure the one or more mini-slots in order to enable a URLLC transmission for a URLLC packet received during the mini-slot.

In some aspects, the control signaling information may include a configuration for a mini-slot that may be used for a URLLC transmission within an eMBB slot. For example, the control signaling information may include information that identifies a location of the mini-slot within the eMBB slot, such as an offset of the mini-slot from an eMBB control resource (e.g., where the offset may identify a first and/or last resource of the mini-slot), a pointer identifying a particular resource in which the mini-slot starts and/or ends, and/or the like. As another example, the control signaling information may include information that identifies a length of the mini-slot, such as information that identifies a number of symbols in the mini-slot, a particular set of resources in the mini-slot, or the like. As another example, the control signaling information may include information that identifies a location of a URLLC control resource within the mini-slot (i.e., information that identifies a resource where UE 120 may expect to receive URLLC control information).

In some aspects, the control signaling information may include an index value that corresponds to the location of the mini-slot, the length of the mini-slot, and/or the location of the URLLC control resource. For example, BS 110 and UE 120 may have access to a set of index values, where each index value is associated with a particular mini-slot configuration. Here, BS 110 may provide the index value in the control signaling information, and UE may identify the configuration of the mini-slot based at least in part on the index value.

In some aspects, the control signaling information may include information associated with one or more mini-slots to be included within the eMBB slot.

As further shown in FIG. 9B, and by reference number 910, BS 110 may transmit the control signaling information for transmission UE 120, and may transmit the control signaling information within the eMBB slot). For example, BS 110 may transmit the control signaling information at a beginning of the eMBB slot using a control resource of the eMBB slot (e.g., in a slot format indicator channel).

In some aspects, the control signaling information need not include information that identifies a location of a data resource of the mini-slot (i.e., a mini-slot resource carrying URLLC data). In such a case, BS 110 may provide information that identifies the location of the data resource when BS 110 transmits the URLLC control information (e.g., within the mini-slot). Here, UE 120 may decode the URLLC control channel, carrying the URLLC control information, in order to identify the location of the data resource associated with the URLLC transmission. In this way, transmission of the control signaling information may be less resource intensive and/or simplified (e.g., as compared to transmitting the information that identifies the location of the data resource within the mini-slot). Alternatively, the control signaling information may include information that identifies the location of the data resource of the mini-slot.

As shown by reference number 915, UE 120 may receive the control signaling information. As shown by reference number 920, based at least in part on transmitting the control signaling information, BS 110 may transmit a URLLC transmission using the mini-slot identified in the control signaling information. In this manner, BS 110 may provide UE 120 with control signaling information that enables multiplexing of eMBB transmissions with URLLC transmissions in an eMBB slot.

In some aspects, BS 110 may provide a downlink control information (DCI) grant in order to allocate a mini-slot for use in providing the URLLC transmission. For example, when BS 110 has received one or more URLLC packets for transmission (e.g., prior to an eMBB slot beginning), BS 110 may provide a DCI grant (e.g., using a control resource of the eMBB slot). The DCI grant may allow BS 110 to specify which mini-slot(s) may be used to transmit URLLC data, inform one or more URLLC UEs of mini-slots in which to expect to receive URLLC data, and/or inform one or more eMBB UEs of mini-slots in which to not expect to receive eMBB data.

In some aspects, techniques described herein may facilitate uplink URLLC communications. For example, on the uplink, a URLLC configured UE 120 may operate in a rateless HARQ mode (e.g., a mode where UE 120 repeatedly transmits coded bits until an ACK is received from BS 110, rather than waiting for an ACK or NACK and a grant for re-transmission). In order to support the rateless mode, BS 110 may allocate an acknowledgment resource within a mini-slot in which UE 120 can expect to receive acknowledgment information associated with the HARQ transmission (e.g., an ACK or a NACK). In some aspects, BS 110 may provide information that identifies the acknowledgment resource (e.g., in the control signaling information, on the URLLC control channel that is identified in the control signaling information). Here, UE 120 may monitor the identified acknowledgment resource and determine whether to terminate the rateless HARQ transmission.

The techniques for control signaling described allow UE 120 to operate in a reliable and efficient manner such that URLLC service requirements may be satisfied. For example, the techniques described herein enable UE 120 to identify resources UE 120 should monitor for URLLC control information. Here, based at least in part on detecting URLLC-control information on the identified resources, UE 120 may identify resources allocated for a URLLC data transmission and proceed with URLLC communication.

As indicated above, FIGS. 9A and 9B are provided as examples. Other examples are possible and may differ from what was described with respect to FIGS. 9A and 9B.

Figure 10:
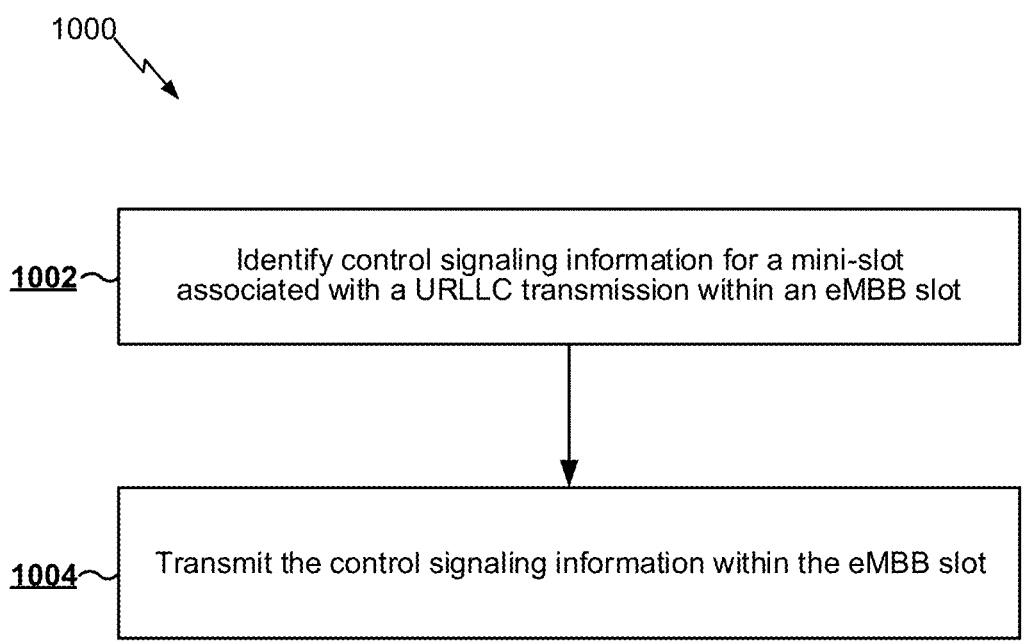
FIG. 10 is a flow chart of a process of wireless communication.

FIG. 10 is a flow chart of a process 1000 of wireless communication. The process may be performed by an access point (e.g., BS 110, 5G access node 506, apparatus 1102 of FIG. 11, apparatus 1102' of FIG. 12, etc.) or another network entity.

At 1002, the access point may identify control signaling information for a mini-slot associated with a URLLC transmission within an eMBB slot.

In some aspects, the control signaling information may include a configuration for a mini-slot that may be used for a URLLC transmission within an eMBB slot. For example, the control signaling information may include information that identifies a location of the mini-slot within the eMBB slot, information that identifies a length of the mini-slot, information that identifies a location of a URLLC control resource within the mini-slot, and/or the like. Additionally, or alternatively, the control signaling information may include information that identifies an index value that corresponds to the location of the mini-slot, the length of the mini-slot, and/or the location of the URLLC control resource. Additionally, or alternatively, the control signaling information may include information that identifies a location of a data resource within the mini-slot. Additionally, or alternatively, the control signaling information may include information that identifies a location of an acknowledgment resource within the mini-slot. In some aspects, the control signaling information may include information associated with one or more mini-slots to be included within the eMBB slot.

At 1004, the access point may transmit the control signaling information within the eMBB slot. In some aspects, the access point may transmit the control signaling information to a UE (e.g., UE 120). For example, the access point may transmit the control signaling information at a beginning of the eMBB slot using a control resource of the eMBB slot (e.g., in a slot format indicator channel). Alternatively, the access point may transmit the control signaling information in a resource other than the control resource of the eMBB slot.

In this manner, the access point may transmit control signaling information that enables multiplexing of eMBB transmissions with URLLC transmissions in an eMBB slot.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
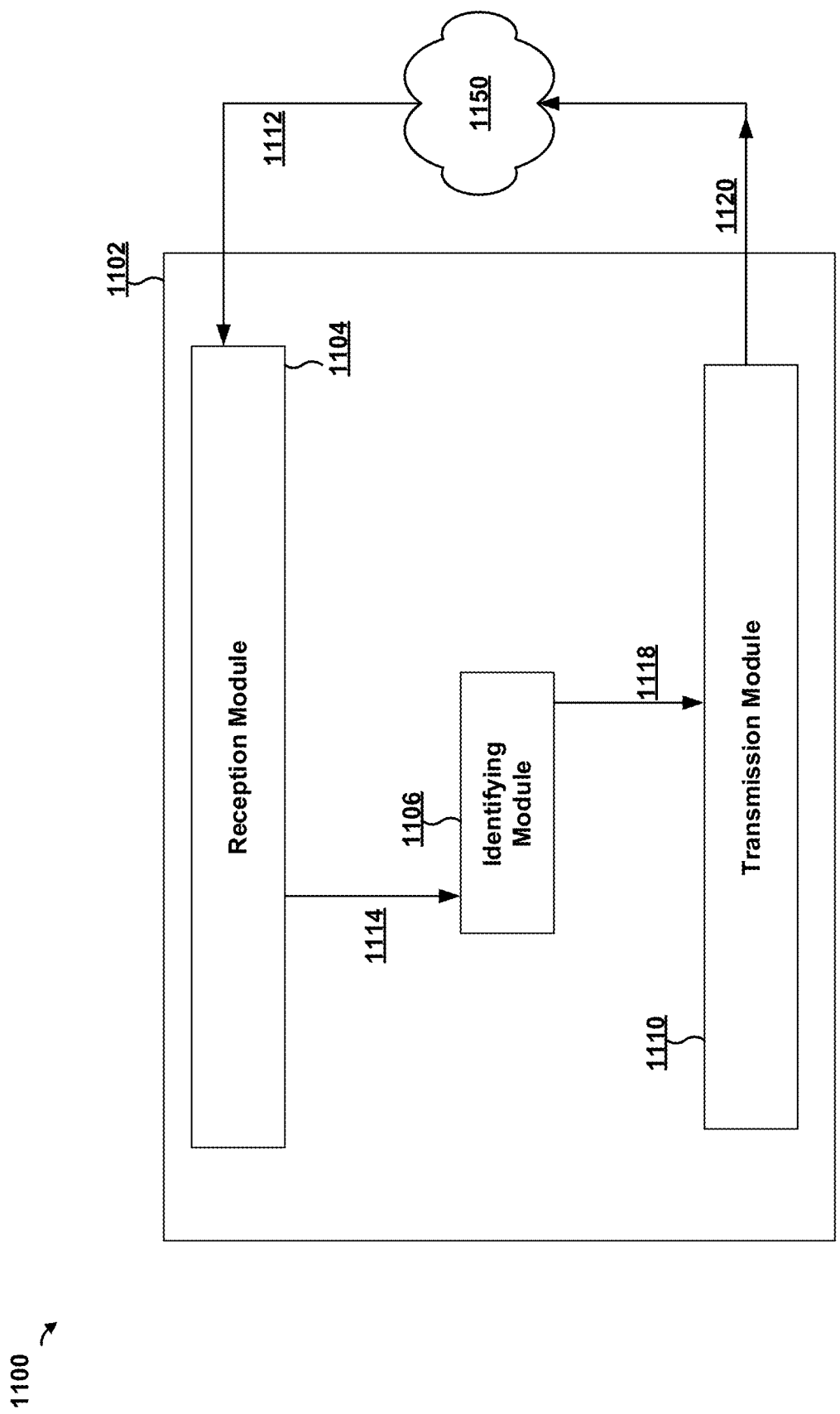
FIG. 11 is a conceptual data flow diagram illustrating the data flow between different modules/means/components in an example apparatus.

FIG. 11 is a conceptual data flow diagram 1100 illustrating the data flow between different modules/means/components in an example apparatus 1102. The apparatus 1102 may be an access point, such as BS 110, 5G access node 506, and/or the like. In some aspects, the apparatus includes a reception module 1104, a identifying module 1106, and/or a transmission module 1110.

The reception module 1104 may receive data 1112 from a network 1150, such as data transmitted by one or more one or more other network entities. In some aspects, the reception module 1104 may provide data 1114 to the identifying module 1106. In some aspects, the data 1114 may indicate that the identifying module 1106 is to identify control signaling information for a mini-slot associated with a URLLC transmission within an eMBB slot. The identifying module 1106 may identify the control signaling information for the mini-slot associated with the URLLC transmission.

The identifying module 1106 may provide data 1118 to the transmission module 1110. For example, the identifying module 1106 may provide data 1118, including the control signaling information, to transmission module 1110. The transmission module 1110 may transmit data 1120, including the control signaling information, to network 1250 and/or to a UE within the eMBB slot.

The apparatus may include additional modules that perform each of the blocks of the algorithm in the aforementioned flow chart of FIG. 11. As such, each block in the aforementioned flow chart of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 11 are provided as an example. In practice, there may be additional modules, fewer modules, different modules, or differently arranged modules than those shown in FIG. 11. Furthermore, two or more modules shown in FIG. 11 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
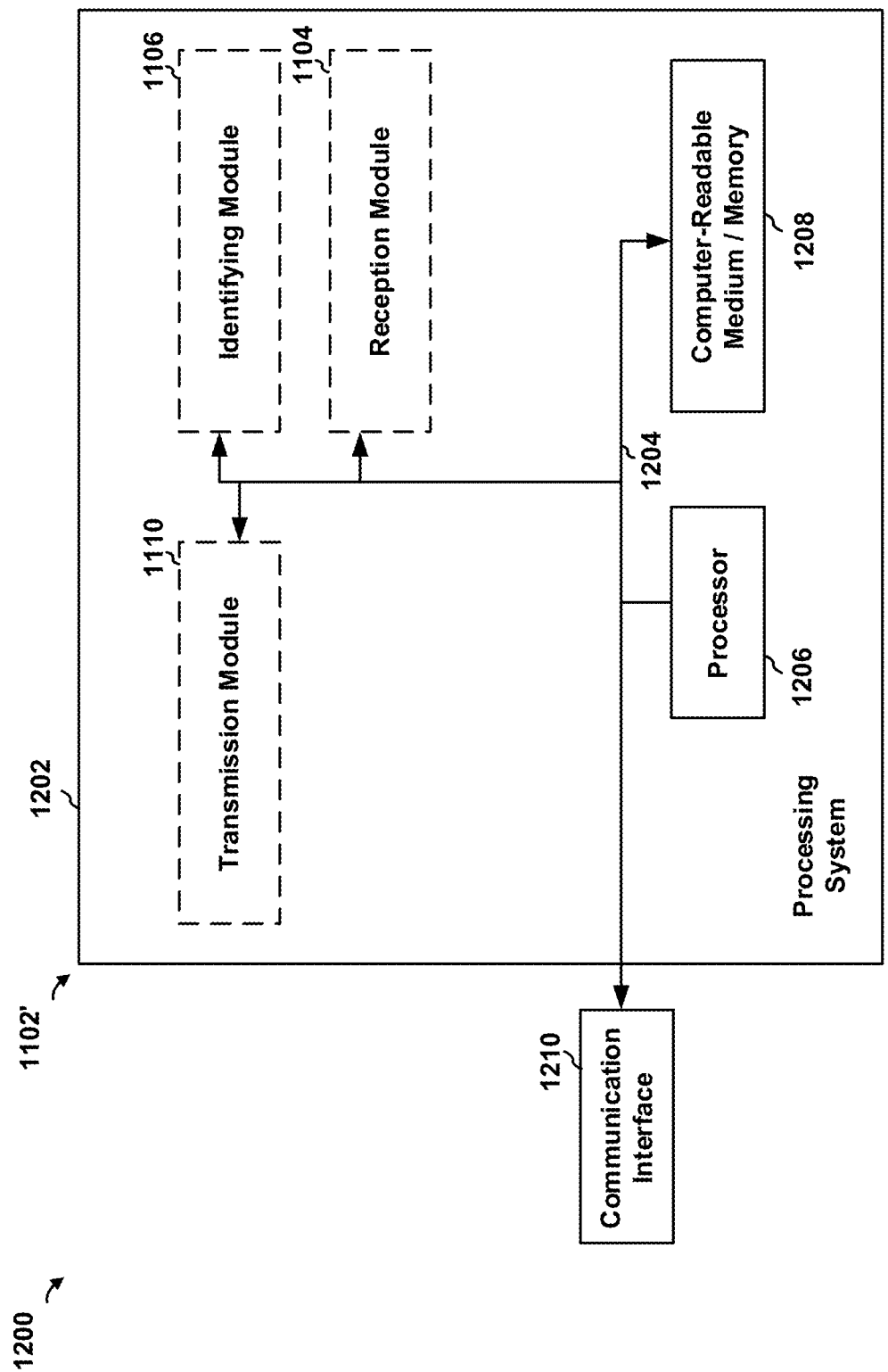
FIG. 12 is a diagram illustrating an example of a hardware implementation for an apparatus employing a processing system.

FIG. 12 is a diagram 1200 illustrating an example of a hardware implementation for an apparatus 1102' employing a processing system 1202. The apparatus 1102' may be an access point, such as BS 110, a 5G access node 506, and/or the like.

In some aspects, the processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, 1108, 1110 and the non-transitory computer-readable medium/memory 1208. The bus 1204 may also link various other circuits such as timing sources, peripherals, voltage regulators, and power management circuits, which are well known in the art, and therefore, will not be described any further.

The processing system 1202 may be coupled to a communication interface 1210. The communication interface 1210 provides a means for communicating with various other apparatus over a transmission medium. The communication interface 1210 receives a signal via the transmission medium, extracts information from the received signal, and provides the extracted information to the processing system 1202, specifically the reception module 1104. In addition, the communication interface 1210 receives information from the processing system 1202, specifically the transmission module 1110, and based at least in part on the received information, generates a signal to be applied to the transmission medium. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described supra for any particular apparatus. The computer-readable medium/memory 1208 may also be used for storing data that is manipulated by the processor 1206 when executing software. The processing system further includes at least one of the modules 1104, 1106, 1108, and 1110. The modules may be software modules running in the processor 1206, resident/stored in the computer readable medium/memory 1208, one or more hardware modules coupled to the processor 1206, or some combination thereof. The processing system 1202 may be a component of the BS 110 and may include the memory 242 and/or at least one of the TX MIMO processor 230, RX processor 238, and the controller/processor 240.

In one configuration, the apparatus 1102/1102' for wireless communication includes means for identifying control signaling information for a mini-slot associated with a URLLC transmission within an eMBB slot, and/or means for transmitting the control signaling information within the eMBB slot. The aforementioned means may be one or more of the aforementioned modules of the apparatus 1102 and/or the processing system 1202 of the apparatus 1102' configured to perform the functions recited by the aforementioned means. As described supra, the processing system 1202 may include the TX MIMO processor 230, the RX processor 238, and the controller/processor 240. As such, in one configuration, the aforementioned means may be the TX MIMO processor 230, the RX processor 238, and the controller/processor 240 configured to perform the functions recited by the aforementioned means.

FIG. 12 is provided as an example. Other examples are possible and may differ from what was described in connection with FIG. 12.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   identifying, by an access point, control signaling information for a mini-slot associated with an ultra-reliable low-latency communication (URLLC) transmission within an enhanced mobile broadband (eMBB) slot,
      wherein the control signaling information includes information that identifies a location of a URLLC control resource in the mini-slot; and
   transmitting, by the access point, the control signaling information within the eMBB slot.

2. The method of claim 1, wherein the control signaling information further includes information that identifies one or more of: a location of the mini-slot, a length of the mini-slot, or any combination thereof.

3. The method of claim 2, wherein the information that identifies the location of the mini-slot includes information that identifies at least one of:
   an offset from a control resource of the eMBB slot, or
   a pointer identifying a particular resource of the eMBB slot.

4. The method of claim 1, further comprising transmitting URLLC control information using the URLLC control resource,
   wherein the URLLC control information includes information that identifies a location of a data resource in the mini-slot.

5. The method of claim 1, wherein the control signaling information includes an index value that corresponds to a location of the mini-slot, a length of the mini-slot, or the location of the URLLC control resource in the mini-slot.

6. The method of claim 1, further comprising transmitting a downlink control information (DCI) grant associated with allocating the mini-slot.

7. The method of claim 1, further comprising transmitting information that identifies a location of an acknowledgment resource in the mini-slot,
   wherein the acknowledgment resource includes information associated with an acknowledgment (ACK) of a hybrid automatic repeat request (HARQ) transmission or a negative-acknowledgment (NACK) of the HARQ transmission.

8. The method of claim 1, wherein the control signaling information further includes information that identifies a location of the mini-slot and a length of the mini-slot.

9. The method of claim 1, wherein the control signaling information further includes information that identifies a location of a data resource in the mini-slot.

10. The method of claim 1, wherein the control signaling information is transmitted using a control resource of the eMBB slot.

11. A device for wireless communication, comprising:
    one or more processors configured to:
       identify control signaling information for a mini-slot associated with an ultra-reliable low-latency communication (URLLC) transmission within an enhanced mobile broadband (eMBB) slot,
          wherein the control signaling information includes information that identifies a location of a URLLC control resource in the mini-slot; and
       transmit the control signaling information within the eMBB slot.

12. The device of claim 11, wherein the control signaling information further includes information that identifies one or more of: a location of the mini-slot, a length of the mini-slot, or any combination thereof.

13. The device of claim 12, wherein the information that identifies the location of the mini-slot includes information that identifies at least one of:
an offset from a control resource of the eMBB slot, or
a pointer identifying a particular resource of the eMBB slot.

14. The device of claim 11,
wherein the one or more processors are further configured to transmit URLLC control information using the URLLC control resource, and
wherein the URLLC control information includes information that identifies a location of a data resource in the mini-slot.

15. The device of claim 11, wherein the control signaling information includes an index value that corresponds to a location of the mini-slot, a length of the mini-slot, or the location of the URLLC control resource in the mini-slot.

16. The device of claim 11, wherein the one or more processors are further configured to transmit a downlink control information (DCI) grant associated with allocating the mini-slot.

17. The device of claim 11,
wherein the one or more processors are further configured to transmit information that identifies a location of an acknowledgment resource in the mini-slot, and
wherein the acknowledgment resource includes information associated with an acknowledgment (ACK) of a hybrid automatic repeat request (HARQ) transmission or a negative-acknowledgment (NACK) of the HARQ transmission.

18. The device of claim 11, wherein the control signaling information includes an index value that corresponds to a location of the mini-slot.

19. A non-transitory computer-readable medium storing instructions for wireless communication, the instructions comprising:
one or more instructions that, when executed by one or more processors of an access point, cause the one or more processors to:
identify control signaling information for a mini-slot associated with an ultra-reliable low-latency communication (URLLC) transmission within an enhanced mobile broadband (eMBB) slot,
wherein the control signaling information includes information that identifies a location of a URLLC control resource in the mini-slot; and
transmit the control signaling information within the eMBB slot.

20. The non-transitory computer-readable medium of claim 19, wherein the control signaling information further includes information that identifies one or more of: a location of the mini-slot, a length of the mini-slot, or any combination thereof.

21. The non-transitory computer-readable medium of claim 20, wherein the information that identifies the location of the mini-slot includes information that identifies at least one of:
an offset from a control resource of the eMBB slot, or
a pointer identifying a particular resource of the eMBB slot.

22. The non-transitory computer-readable medium of claim 19,
wherein the one or more instructions, when executed by the one or more processors, further cause the one or more processors to transmit URLLC control information using the URLLC control resource, and
wherein the URLLC control information includes information that identifies a location of a data resource in the mini-slot.

23. The non-transitory computer-readable medium of claim 19, wherein the one or more instructions, when executed by the one or more processors, further cause the one or more processors to transmit a downlink control information (DCI) grant associated with allocating the mini-slot.

24. The non-transitory computer-readable medium of claim 19,
wherein the one or more instructions, when executed by the one or more processors, further cause the one or more processors to transmit information that identifies a location of an acknowledgment resource in the mini-slot, and
wherein the acknowledgment resource includes information associated with an acknowledgment (ACK) of a hybrid automatic repeat request (HARQ) transmission or a negative-acknowledgment (NACK) of the HARQ transmission.

25. The non-transitory computer-readable medium of claim 19, wherein the control signaling information further includes information that identifies a location of a data resource in the mini-slot.

26. The non-transitory computer-readable medium of claim 19, wherein the control signaling information is transmitted using a control resource of the eMBB slot.

27. An apparatus for wireless communication, comprising:
means for identifying control signaling information for a mini-slot associated with an ultra-reliable low-latency communication (URLLC) transmission within an enhanced mobile broadband (eMBB) slot,
wherein the control signaling information includes information that identifies a location of a URLLC control resource in the mini-slot; and
means for transmitting the control signaling information within the eMBB slot.

28. The apparatus of claim 27, wherein the control signaling information further includes information that identifies one or more of: a location of the mini-slot, a length of the mini-slot, or any combination thereof.

29. The apparatus of claim 28, further comprising means for transmitting URLLC control information using the URLLC control resource,
wherein the URLLC control information further includes information that identifies a location of a data resource in the mini-slot.

30. The apparatus of claim 27, further comprising means for transmitting a downlink control information (DCI) grant associated with allocating the mini-slot.

* * * * *